United States Patent
D'Alessandro et al.

(10) Patent No.: US 12,346,840 B2
(45) Date of Patent: Jul. 1, 2025

(54) DATABASE OPERATIONS AND ANALYSIS FOR VIRTUAL INTERLINE OF TRAVEL ROUTES WITH FEEDBACK LOOP

(71) Applicant: Hopper, Inc., Montreal (CA)

(72) Inventors: David G. D'Alessandro, Atlanta, GA (US); Stephen Charles Pearson, Vancouver (CA)

(73) Assignee: Hopper, Inc., Montreal (CA)

( * ) Notice: Subject to any disclaimer, the term of this patent is extended or adjusted under 35 U.S.C. 154(b) by 0 days.

(21) Appl. No.: 18/370,398

(22) Filed: Sep. 20, 2023

(65) Prior Publication Data
US 2025/0094883 A1    Mar. 20, 2025

Related U.S. Application Data

(63) Continuation of application No. PCT/IB2023/059242, filed on Sep. 18, 2023.

(51) Int. Cl.
*G06Q 10/02*    (2012.01)
(52) U.S. Cl.
CPC .................. *G06Q 10/02* (2013.01)
(58) Field of Classification Search
None
See application file for complete search history.

(56) References Cited

U.S. PATENT DOCUMENTS

| | | | | |
|---|---|---|---|---|
| 2007/0156469 A1* | 7/2007 | Bird | ...................... | G06Q 10/02 705/5 |
| 2008/0114623 A1* | 5/2008 | Berthaud | ............... | G06Q 10/02 705/5 |
| 2010/0145740 A1* | 6/2010 | Claverie | ................ | G06Q 10/08 705/5 |
| 2013/0290324 A1* | 10/2013 | Gibergues | ........... | G06F 16/9538 707/731 |
| 2019/0318274 A1 | 10/2019 | Kamenov et al. | | |

OTHER PUBLICATIONS

Hackwood, Emma, "Tips traveling multiple tickets", https://www.flightcentre.ca/window-seat/tips-travelling-multiple-tickets, Jun. 24, 2021 (Year: 2021).*
Alternative Airlines, "Book Connecting Flights With Different Airlines", alternativesairlines.com, captured Aug. 18, 2022 (Year: 2022).*
PCT International Search Report and Written Opinion, PCT Application No. PCT/IB2023/059242, May 8, 2024, 12 pages.

* cited by examiner

Primary Examiner — George Chen
(74) Attorney, Agent, or Firm — Fenwick & West LLP

(57) ABSTRACT

A system and a method for generating and displaying candidate virtual interline routes for travel between an origin location and a destination location. The system identifies a set of candidate virtual interline routes based on the origin location and the destination location, each including multiple segments offered by different carriers that lack an interline agreement. Each route is associated with a weight determined based on historical data including user input. The routes are ranked based on the weights, and a subset is selected. The system retrieves from external data providers up-to-date data associated with the subset of candidate virtual interline routes, and displays the up-to-date data on a client device of a user.

19 Claims, 12 Drawing Sheets

DATABASE OPERATIONS AND ANALYSIS FOR VIRTUAL INTERLINE OF TRAVEL ROUTES WITH FEEDBACK LOOP

CROSS REFERENCE TO RELATED APPLICATIONS

This application is a bypass continuation of International Application No. PCT/IB2023/059242, filed Sep. 18, 2023, which is incorporated by reference in its entirety.

TECHNICAL FIELD

The disclosure generally relates to the field of database operations, and more particularly relates to database generation and analysis for the purpose of performing virtual interlining operations from disparate sources.

BACKGROUND

Travel via common carriers, like air travel, is typically organized using either a single carrier or a set of carriers engaged in an interline agreement. This agreement, essentially a contractual arrangement between two or more carriers, facilitates collaboration to furnish passengers with more travel choices. Even though these carriers might exist as distinct entities with separate flight schedules, booking systems, and operations, this arrangement allows them to share their flight schedules and link their routes and services.

Nevertheless, in many cases, optimizing travel for a particular traveler's requirements, such as minimizing layover durations, shortening trip times or fuel consumption, and achieving other efficiencies, can be better achieved by amalgamating segments of carriers lacking an interline agreement. Algorithmically, when presented with attributes for a trip—such as point of origin, destination, trip type, travel dates, and more—it becomes computationally infeasible, and perhaps unattainable using present computational capabilities, to calculate every conceivable route formed by combining each feasible segment offered by every potential carrier. Consequently, identifying the best combinations across segments for a traveler to undertake remains a complex challenge.

SUMMARY

Systems and methods are disclosed herein for computing travel routes involving multiple segments that are offered by multiple carriers lacking an interline agreement. Hereinafter, such a travel route is also referred to as a "virtual interline route" where a travel route is composed using virtual interlining.

Assembling a virtual interline route with these segments is often complicated, primarily due to the lack of agreements between carriers causing the different carrier systems to be disconnected. While theoretically users could explore different carriers' systems to search for available flights and piece together travel routes involving multiple segments offered by different carriers, the sheer number of carriers, flight options, and associated attributes poses significant challenges. The complexity is such that even advanced modern computer systems cannot generate solutions in near real time. Moreover, catering to individual user preferences and requirements adds an additional layer of complexity. Narrowing down routes from millions of segments to suit specific user needs compounds the difficulty.

To address these challenges, embodiments described herein include a system, method, and/or a non-transitory storage medium, that identifies a set of candidate virtual interline routes based on a request received from a client device of a user. The request is for booking travel between an origin location and a destination location. Each virtual interline route includes multiple segments that are offered by multiple airlines that lack an interline agreement. Each candidate virtual interline route is associated with a weight. The weight is determined based in part on (1) a prior user action associated with the candidate virtual interline route, and/or (2) comparison between the historical data associated with the virtual interline route and historical data associated with a real route. Hereinafter, a "real route" is referred to as (1) a route including a single segment, (2) a route including multiple segments that are offered by a same carrier, or (3) a route including multiple segments that are offered by multiple carriers that have an interline agreement with each other. The system ranks the set of candidate virtual interline routes based on the weights, and selects a subset of candidate virtual interline routes based on the ranking.

The system also requests, from one or more external data providers (e.g., carrier systems), data associated with segments of the subset of candidate virtual interline routes currently offered by the plurality of carriers. The system generates for display on the client device up-to-date data of the subset of candidate virtual interline routes.

After the user reviews the data associated with the subset of the candidate virtual interline routes, the user may select one of the candidate virtual interline routes. In some embodiments, the system updates a weight of at least one virtual interline route in the set of virtual interline routes based in part on the user selection.

In some embodiments, the system may also request, from the one or more external data providers, up-to-date data associated with a set of real routes between the origin location and the destination location offered by any single carrier or carriers that have an interline agreement with each other. The system determines a difference between a value of an attribute associated with at least one candidate virtual interline route in the subset of candidate virtual interline routes and a value of an attribute associated with at least one real route in the set of real routes. The system updates a weight of the at least one virtual interline route based in part on the difference.

After the weight is updated, responsive to receiving, from a second client device (which may or may not be a same device as a previous client device), a second request to booking travel between the origin location and the destination location, the system reranks the set of candidate virtual interline routes based in part on the updated weight and selects a second subset of candidate virtual interline routes from the set of candidate virtual interline routes based on the reranking, and generates for display on the second client device the up-to-date data of the second subset of candidate virtual interline routes.

This process continues such that the weights of virtual interline routes are dynamically updated based on user input and/or comparison between data associated with the virtual interline routes and real routes.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
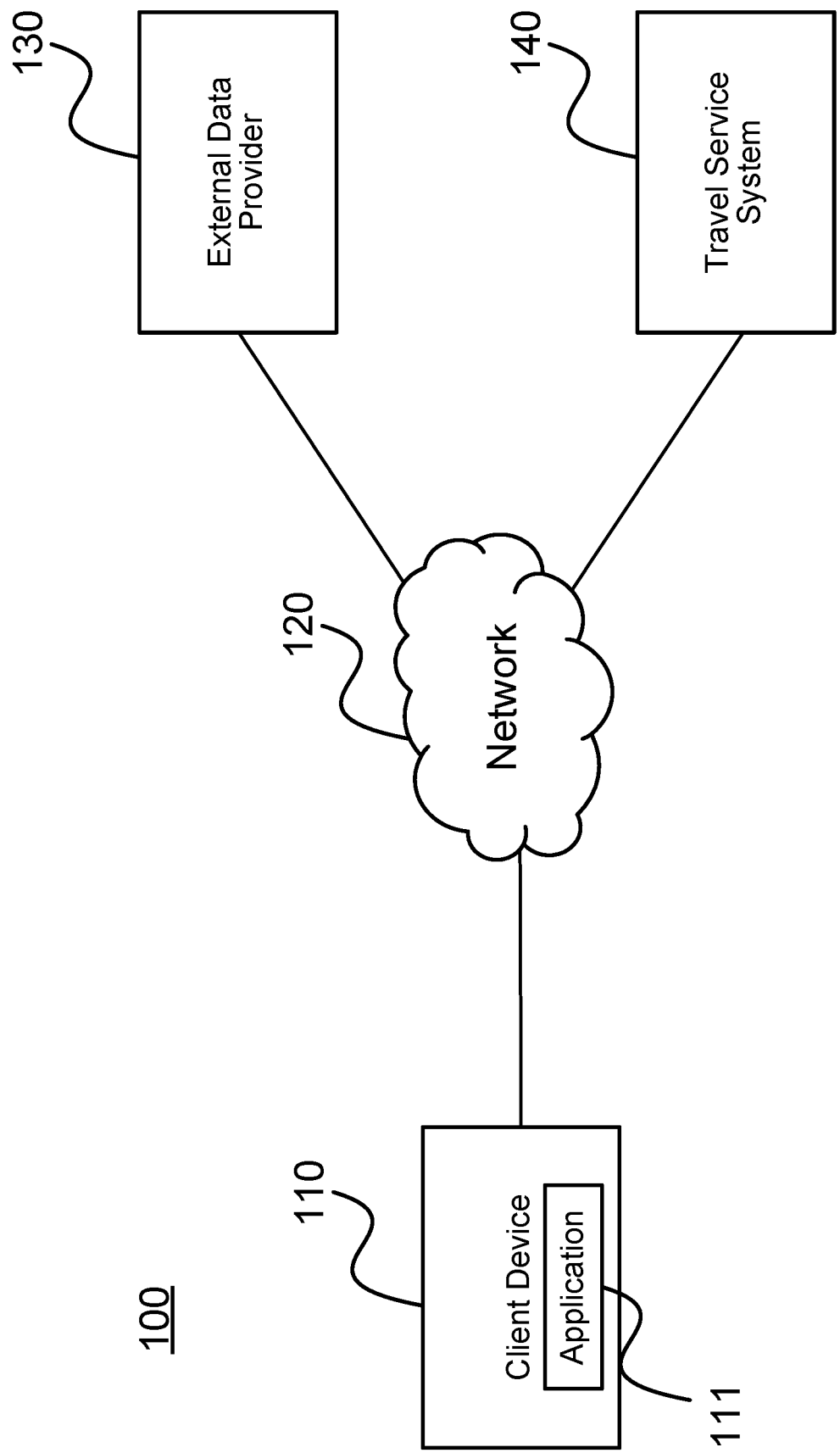
FIG. 1 illustrates an example environment having a client device, a travel service system, and an external data provider in accordance with some embodiments.

Interline, also known as interline ticketing and interline booking, is a voluntary commercial agreement between individual airlines to handle passengers traveling on routes that require multiple flights on multiple airlines. Travel using common carriers, such as air travel, is often planned using a single carrier or carriers having such voluntary commercial agreements. However, by combining travel across segments (which are segments that are separately ticketed without interline), travel may be better optimized for a given traveler's needs (e.g., resulting in reduced layover times, short trips that take less time or less fuel, and other efficiencies).

A virtual interline route described herein is a route including segments that are offered by carriers lacking an interline agreement. However, algorithmically, given attributes for a trip such as an origin, a destination, a trip type, trip dates, and so on, it is computationally impractical, and perhaps impossible using today's available computational capacity, to compute every possible route by combining every possible leg offered by every possible carrier in order to determine best combinations across segments for a traveler to take. Further, a computer-generated suggestion might be appealing or unappealing to a customer based on a range of factors. For instance, data indicates that customers usually favor shorter layover times, yet they are comfortable with an extended layover in some locations (e.g., Las Vegas).

The principles described herein solve the above-described problem by assigning a weight to each identified virtual interline route and implementing a feedback loop that relies on user input and comparison of data associated with virtual interline routes with real routes that are offered by a single carrier or carriers with an interline agreement to update the weights. For example, if a virtual interline route is often selected by users, the virtual interline route may be assigned a high weight, such that it is ranked at the top. On the other hand, if a virtual interline route is never selected by a user for a threshold period of time, the system may set its weight low, such that the virtual interline route is no longer suggested to users in some cases. In some embodiments, the system may be able to individually turn off routes until an entire origin-destination pair is turned off entirely because that pair is simply not competitive for virtual interline. For example, Boston to LaGuardia (BOS->LGA) is serviced by a significant number of inexpensive "shuttle" flights. The feedback loop may eventually determine that all potential virtual interline routes for BOS->LGA are not competitive thus, removing the pair from being included in the search.

Further, since the system only obtains up-to-date data about the highly ranked virtual interline routes, the computing and network resource usage is significantly reduced. This effectively prevents the occurrence of network congestion.

In some embodiments, a travel system is configured to receive, from a client device of a user, a request to book travel between an origin location and a destination location and identify a set of candidate virtual interline routes based on the origin location and the destination location. Each candidate interline route includes a first segment offered by a first carrier of a plurality of carriers and a second portion offered by a second carrier of the plurality of carriers that does not have an interline agreement with the first carrier.

In some embodiments, identifying the set of candidate virtual interline routes includes accessing a route graph comprising nodes representing travel hub locations and edges connecting nodes representing segments of routes, and applying a constraint function to the route graph to identify the subset of candidate virtual interline routes. For example, the constraint function may include a constraint based on the origin location and the destination location, time of a day, day of a week, and/or a maximum number of segments to be allowed in the selected interline routes. In some embodiments, the route graph is generated based on historical data associated with routes. The historical data may be obtained from external data systems (e.g., carriers' data systems), or based on historical user requests.

The travel system retrieves a weight for each of the set of candidate virtual interline routes. The weights are determined based in part on: (1) prior user action associated with a corresponding candidate virtual interline route, and/or (2) comparison of data associated with the corresponding candidate virtual interline route and data associated with real routes between the origin location and the destination location. Opposite to a "virtual interline route", a "real route" is a route offered by a single carrier or multiple carriers with an interline agreement.

The travel system ranks the set of candidate virtual interline routes based in part on the weights, and selects a subset of candidate virtual interline routes based on the ranking. In some embodiments, each candidate virtual interline route has a set of attributes. For each virtual interline route, values of the set of attributes are summarized into a score. The weight associated with the virtual interline route is applied to the score to generate a weighted score. The set of candidate virtual interline routes are ranked based on the weighted scores.

The travel system requests from one or more external data providers (e.g., carriers' data systems) data associated with segments of the subset of candidate virtual interline routes currently offered by the plurality of carriers. Such data may include (are not limited to) price, time, date of each segment. The travel system generates for display on the client device up-to-date data of the subset of candidate virtual interline routes in an order based on the ranking.

The user may interact with the displayed virtual interline routes, e.g., selecting one of the virtual interline routes, and/or purchasing the segments of the virtual interline routes. The travel system may update a weight of at least one virtual interline route based in part on the user selection.

After the weight of at least one virtual interline route is updated, responsive to receiving, from a second client device (which may or may not be the same as the previous client device) a second request for booking travel between the origin location and the destination location, the travel system reranks the set of candidate virtual interline routes based in part on the updated weight, selects a second subset of candidate virtual interline routes based on reranking, and generates for display on the second client device data of the second subset of candidate virtual interline routes currently offered by carriers.

Additional details about the travel system are described below with respect to the figures, although the Figures (FIGS.) and the following description relate to example embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Travel Service System

FIG. 1 illustrates an example environment 100 including one or more client device(s) 110, one or more external data provider(s) 130, and a travel service system 140 configured to communicate with each other via a network 120. Client device 110 may be any device facing an end user. Examples of client devices include mobile devices like smart phones and tablet computers, laptops, personal computers, smartwatches, internet-of-things (IoT) devices, and any other device with, or capable of being coupled to, a display with which the user can interact to cause data to be transmitted over a network. Network 120 may be any data network, such as the Internet or any other network that facilitates data communication between client device 110 and a service.

Client device 110 includes application 111. In some embodiments, Application 111 may be downloaded from travel service system 140. In some embodiments, application 111 may be a web application configured to be accessed via a browser, a browser extension, a browser add-on, or a downloadable application that is downloaded onto the client device 110. In any case, application 111 enables a user of client device 110 to request to book travel. For example, a user using the client device 110 may input a request including an origin location and a destination location. The travel service system 140 identifies a set of candidate virtual interline routes based on the origin location and the destination location. Each virtual interline route includes multiple segments offered by different carriers that lack an interline agreement.

In some embodiments, a plurality of attributes are explicitly or implicitly associated with the request. In some embodiments, the user may input some attributes. In some embodiments, because each route between the origin location and the destination location is associated with a plurality of attributes, the request is implicitly associated with the plurality of attributes. In some embodiments, the plurality of attributes include one or more indicia of directionality of route, a maximum number of layovers, acceptable carriers, duration constraints, and/or layover time constraints. Note, the principles described herein are not limited to air travel, and they can be applied to other transportation means, such as (but not limited to) trains and buses, and other travel-related bookings.

The origin location and the destination location transmitted over network 120 (which may be any data communications network, such as the Internet) to travel service system 140. Responsive to receiving the request from the client device 110, travel service system 140 may apply a constrained function to a subset of the plurality of attributes, which in turn may be applied to a route graph to rank routes between the origin location and the destination location. Travel service system 140 may then use the rankings of the routes to determine a subset of the routes.

Notably, it is advantageous to apply a constrained function to a subset of the plurality of attributes that omits one or more of the plurality of attributes because path enumeration of a large well-connected graph is combinatorial explosive. The more attributes are being considered, the more dimensions of computational complexity are to be solved by the travel service system 140. The mathematical problem to solve for the bundling strategy is a real challenge due to the voluminous combinations of paths. Even the most advanced modern computers are incapable of solving such a bundling strategy within a reasonable time for a user. For example, to traverse all the possibilities and consider all the attributes, a computer system may take hours or days to generate a subset of routes. Further, the subset of routes may also include a significant number of segments, which are then queried from the external data provider 130. Notably, each external data provider has its own limited bandwidth. A large number of queries in a short period may take up the bandwidth of the external data provider 130, resulting in a deteriorated performance of the external data provider 130. The travel service system 140 described herein solves this problem in part by generating a route graph, and applying the constraint function to a subset of attributes associated with edges in the route graph, which reduces computation time and usage of resources.

For example, based on a user request, for each possible route, a plurality of attributes should be considered. For example, the plurality of attributes may include a number of layovers, carriers, layover time, availability of free carry-on luggage, total cost, departure time, arrival time, etc. Considering all the plurality of attributes would require performance of massive computations, which may require lots of computing resources and/or take a longer time than a user would like to wait for. In embodiments, to reduce the computation time, a subset of attributes is applied to a constrained function to narrow the search criteria. For example, the subset of attributes may only include a number of layovers, carriers, and layover time. In some embodiments, the subset of the attributes may be a default set of attributes set by the travel service system 140. In some embodiments, the subset of the attributes may be selected based on the user profile and/or user's historical information. For example, travel service system 140 may prioritize a subset of attributes based on the user's historical travel bookings.

The constrained function is then applied to the route graph to rank and select a subset of routes. For example, the constrained function may limit a maximum number of layovers (e.g., 1 stop), acceptable carriers (e.g., carriers A and B), and a maximum layover time (e.g., 2 hours) to identify a subset of routes in the route graph and rank the subset of routes based on their values of the subset of the attributes. In this example, applying the constrained function, the travel service system 140 may start from the origin location (or the destination location) on the route graph, and traverse each hub location that is also linked to the destination location to identify the routes that only have 1 stop and offered by carriers A and B. The layover times can then be identified for each of these routes, and the routes that have longer layover times are filtered out. These routes are between the origin location and the destination location and satisfy the constrained function. However, the number of these routes may still be fairly large. These routes may then be ranked based on the value of the subset of attributes to identify a few top-ranked routes. For instance, the routes with the shortest total time may be ranked the highest.

In addition to ranking the routes based on the subset of attributes, each of the routes is also associated with a weight determined based in part on (1) prior user input associated with the corresponding route, and/or (2) comparison between data associated with the corresponding route and data associated with real routes having a same origin location and destination location. The ranking of the routes is further based on the weights associated thereof. In some embodiments, for each virtual interline route, values of the set of attributes are summarized into a score. The weight associated with the virtual interline route is applied to the score to generate a weighted score. The set of candidate virtual interline routes are ranked based on the weighted scores.

The travel service system 140 then selects a subset of candidate routes based in part on the ranking. The selection may be based on a predetermined threshold, for example, the selection may be based on a predetermined number of the subset of routes that are to be selected, for example, only the top 5 routes are selected.

After that, travel service system 140 may then send a request to the external data providers 130 for data on the subset of routes. The external data provider 130 may be data systems of the carriers that offer the segments in the route. In some embodiments, responsive to receiving the data from the external data providers 130, the travel service system 140 generates for display on the client device 110 up-to-date data of the subset of routes obtained from the external data providers 130. In some embodiments, the data of the subset of routes are displayed in an order based on the ranking.

Notably, the current route data may be different from historical route data stored with the graph. Thus, the selected subset of routes based on ranking may or may not satisfy the attributes at any given time. In some embodiments, responsive to receiving the data, the travel service system 140 then determines one or more candidate routes between the origin location and the destination location that satisfy each of the plurality of attributes. In some embodiments, a route subgraph is generated based on the up-to-date data. The routes between the origin location and the destination location in the route subgraph may also be ranked, and the determination of the candidate routes is based on the ranking of the routes in the route subgraph.

Figure 2:
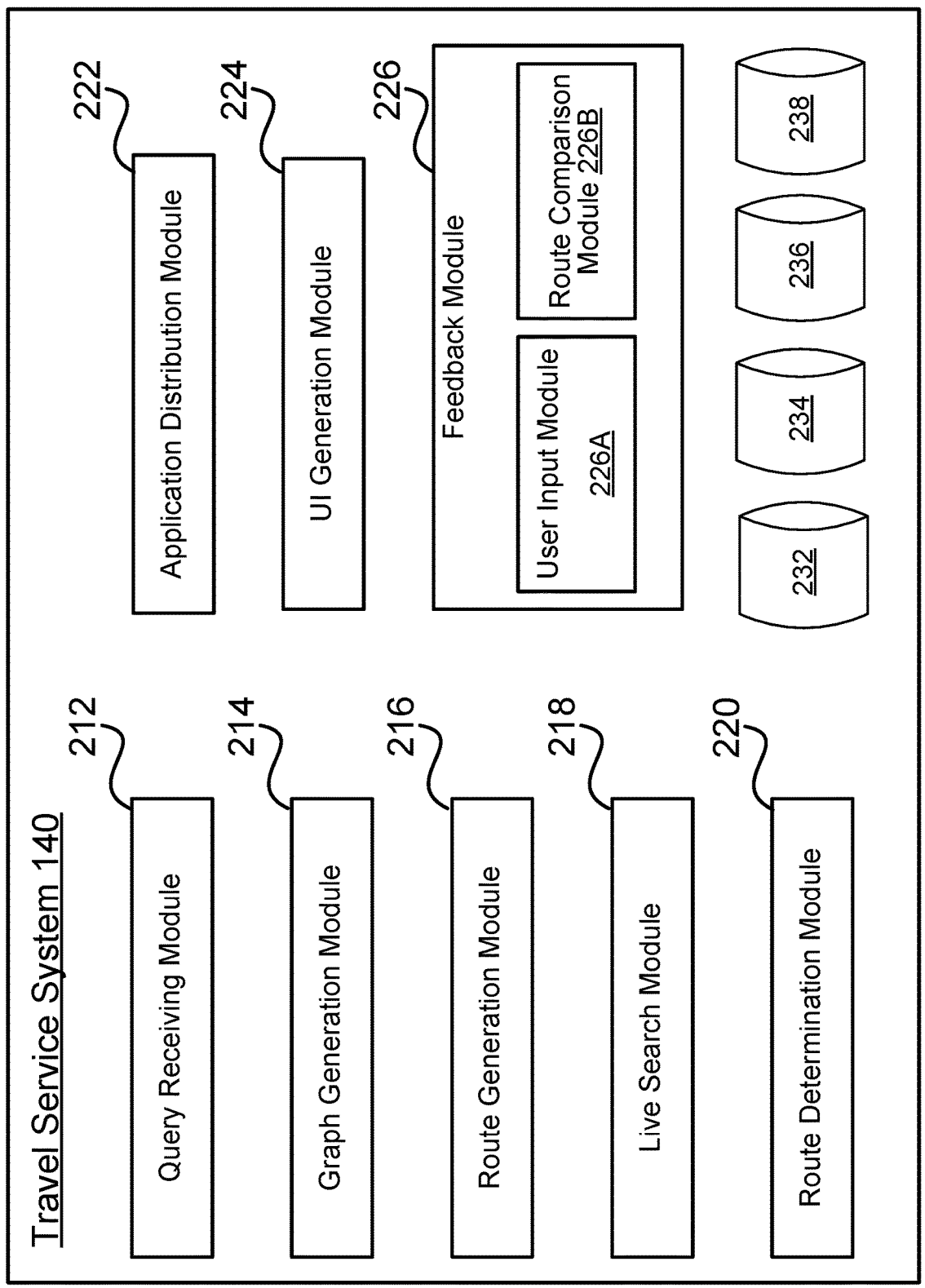
FIG. 2 illustrates an example travel service system in accordance with some embodiments.

Further details about travel service system 140 will be described below with respect to FIGS. 2-10. FIG. 2 illustrates one embodiment of exemplary modules and databases of the travel service system. As depicted in FIG. 2, travel service system 140 includes query receiving module 212, graph generation module 214, route generation module 216, live search module 218, route determination module 220, application distribution module 222, UI generation module 224, a feedback module 226, as well as historical data 232, constrained function 234, route graph 400, and weights 238 associated with historical routes. The modules and databases depicted in FIG. 2 are merely exemplary; fewer or more modules may be used to achieve the functionality described herein. Moreover, the modules and databases need not be in a single location, and may be distributed across environment 100 and intercommunicated using network 120.

Historical data 232 is a database accessible to the travel service system 140. In some embodiments, the travel service system obtains historical data 232 from prior usage of the application (e.g., application 111) installed on various client devices (e.g., client device 110). For example, when a user requests to book travel via application 111, travel service system 140 receives the request, determines candidate routes, and displays the candidate routes on the client device 110, using application 111. After that, the user may then select one of the candidate routes to book the travel via application 111. Responsive to the user's selection of the candidate route, travel service system 140 receives the user's selection, and generates a query to external data provider 130 to book the travel. Travel service system 140 can then store user's request, the candidate routes, and/or the user-selected route in historical data 232.

Graph generation module 214 uses historical data 232 to generate a route graph 400. The route graph 400 includes nodes representing travel hub locations, and edges connecting nodes. In particular, the edges include information indicative of attributes of the historical trips. The attributes may include (but are not limited to) indicia of directionality of route, maximum number of layovers, acceptable carriers, duration constraints, and/or layover time constraints. In some embodiments, the historical attributes may also include departure time, arrival time, a likelihood of delay, distance traveled, time traveled, a capacity of transportation mean, and/or a cost of a trip. In some embodiments, "booking travel" described herein is a database operation that, when effected, causes travel service system 140 to access the route graph generated based on historical data, and causes the travel service system 140 to store data associated with the booking in historical data 232. The updated historical data 232 may then trigger the route graph to be modified, and/or weights associated with each interline route to be updated. Further details about graph generation module 214 and the route graph 400 will be described below with respect to FIGS. 3-4.

Query receiving module 212 receives requests for travel from one or more client devices (e.g., client device 110).

Each request includes an origin location and a destination location, and a plurality of attributes. In some cases, the travel is a round trip travel, the query receiving module 212 separates the travel into two trips, namely (1) an outbound trip from a first location to a second location, and (2) a return trip from the second location to the first location. Responsive to receiving a request, for each trip (e.g., an outbound trip and/or a return trip), query receiving module 212 causes route generation module 216 to apply a constrained function 234 to a subset of attributes of the route graph to rank routes in the graph. Further, the route generation module 216 also accesses weights 238 historical routes and uses the weights 238 to adjust the ranking of the routes.

The route generation module 216 selects a subset of the routes based on the ranking. In some embodiments, determining the subset of routes includes selecting a subset of routes having highest rankings. In some embodiments, the subset of routes is routes that have values of an attribute (e.g., total travel time, total cost) that are above a predetermined threshold. Alternatively, or in addition, the subset of routes is a predetermined number of routes. In some embodiments, when no routes are found, route generation module 216 may remove some of the constrains on some of the attributes.

For example, the subset of attributes may include a travel time and a total cost. Applying the subset of attributes to a constrained function may cause the route generation model 216 to identify a subset of routes that has a travel time of fewer than 8 hours, and a total cost of less than $500. These routes are then ranked based on their respective travel time, total cost, and their respective weights. In some embodiments, the routes are first ranked based on the values of the attributes. After that, the ranking is then adjusted based on their respective weights. For example, by default, travel service system 140 may identify three candidate routes, and rank them as follows: (1) a first-ranked route having a total travel time of 6 hours and costing $300 (2) a second-ranked route having a total travel time of 5 hours and costing $400 (3) a third-ranked route having a total travel time of 7 hours and costing $300. Each of the three routes is associated with a weight. The ranking is adjusted based on the weight. In some embodiments, the ranking and adjusting the ranking are performed as a single step based on the subset of attributes and the weights. For example, the values of the attributes of each route may be weighted based on the weight. Further details about route generation module 216 will be described below with respect to FIGS. 5-6.

After the subset of the routes are determined, the travel service system 140 transmits the determined subset of routes to live search module 218. The live search module 218 is configured to generate and send one or more queries to one or more external data providers 130, which could be data systems of carriers. These queries are configured to request up-to-date data associated with the subset of routes from the external data providers 130. The up-to-date data includes up-to-date values of attributes of the subset of the routes, which can be booked by travelers at a current time. Such up-to-date attributes may include (but are not limited to) indicia of directionality of route, a maximum number of layovers, acceptable carriers, duration constraints, layover time constraints, departure time, arrival time, distance traveled, time traveled, a capacity of transportation mean, and/or a cost of a route that can be booked by a user at a current time.

Subsequently, the up-to-date data is processed by route determination module 220, which determines one or more final candidate routes. In some embodiments, route determination module 220 causes graph generation module 214 to generate a route subgraph based on up-to-date data received from the external data providers 130. Note, unlike the route graph 236 (which is generated by historical data), the route subgraph here is generated based on up-to-date data received from the external data providers 130.

Route determination module 220 determines the one or more final candidate routes based on applying the constraint functions and a subset of attributes to the route subgraph. For example, in some embodiments, route determination module 220 compares values of all the plurality of attributes (or weighted average of the plurality of attributes) of the up-to-date data associated with the subset of routes, and ranks them based on the values. In some embodiments, the route determination module 220 may also adjust the ranking of the final candidate routes based on weights 238.

As search results are sourced from external data providers 130, there might be a delay in receiving results from each provider. To address this, the live search module 218 may establish a predetermined time threshold, e.g., 5, 10, or 15 seconds. If this threshold is reached without results, the live search module 218 may cancel outstanding requests to external providers that haven't responded and forwards any received results to the route determination module 220. Additionally, the live search module 218 may prompt the UI generation module 224 to stream received search outcomes in real time, enabling users to monitor the search progress.

Upon determining the final candidate routes, the UI generation module 224 generates a user interface on the client device (e.g., client device 110) through application 111. These routes can be ranked based on specific attributes, and/or weights 238. In some embodiments, higher-ranked routes are presented more prominently. Users can interact with the UI to select a candidate route for review or booking.

Because routes, offered by carriers, can change unpredictably due to factors like supply-demand dynamics and staff availability, the same request from a client device 110 at different times may yield varying final candidate routes. These final candidate routes, generated based on up-to-date data from external providers, can be similarly ranked based in part on up-to-date values of attributes and weights. However, it is important to note that this ranking based in part on up-to-date values of the attributes may be different from the ranking based in part on historical values of the attributes. After the UI is generated to display the set of final candidate routes, the user may select or book one of the displayed interline routes.

The travel service system 140 also includes a feedback module 226 including a user input module 226A and a route comparison module 226B. The user input module 226A is configured to detect and record user input associated with a particular route and adjust a weight of the corresponding route based on the user input. For example, when a user selects one of the candidate routes that is not the highest ranked candidate route, the user input module 226A analyzes the user selection and modifies the weight associated with the corresponding route.

The route comparison module 226B is configured to compare a virtual interline route with real routes that are offered by a single carrier or carriers with an interline agreement. In some embodiments, a value of an attribute associated with a virtual interline route is compared with a value of the attribute associated with a real route to determine a difference. A weight corresponding to the virtual interline route is adjusted based on the difference. The attribute may include (but is not limited to) a total travel time, a total cost, a time frame (e.g., morning, evening, red eye) of the route corresponding to the route. For example, when a total travel time of a virtual interline route is lower than a total travel time of a real route, the weight corresponding to the virtual interline route may be adjusted to be greater; otherwise, the weight corresponding to the virtual interline route may be adjusted to be lower.

Responsive to receiving a new request to booking travel between a new origin location and a new destination location again from the same user, the route generation module 216 and the route determination module 220 determine a new subset of virtual interline routes based on the modified weights associated with the route. The new subset of routes with new rankings can then be used to perform a live search to identify one or more final candidate routes based on the modified weights associated with the routes. The one or more new candidate routes may also be ranked based on the modified weights associated with the routes. Finally, in response to the updated rankings, the UI generation module 224 generates a new UI that displays the final candidate routes based on their rankings.

Notably, each virtual interline route includes multiple segments, which lack awareness of each other. Consequently, delays in one segment don't trigger the other segments or the carrier to make adjustments. To address this issue, in some embodiments, the travel service system 140 can continuously monitor the segments' status after booking. Upon detecting a delay or cancellation in a segment, the service performs a new search and identifies fresh segments to mitigate the issue. Users may receive notifications displaying the new segments, and the travel service system 140 might automatically cancel an impacted following segment and arrange a replacement.

Graph Generation Module

Figure 3:
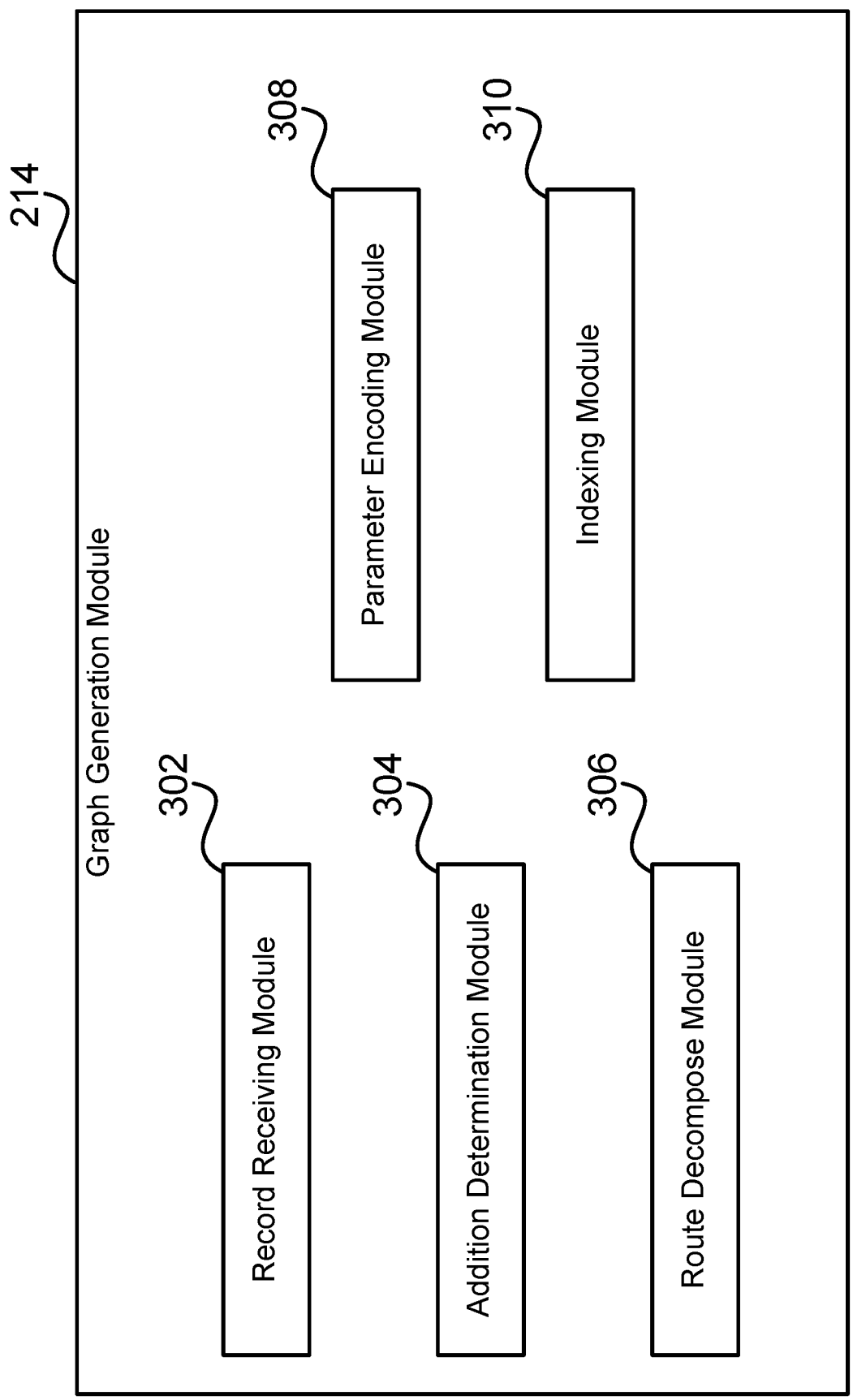
FIG. 3 illustrates an example graph generation module of a travel service system in accordance with some embodiments.

FIG. 3 illustrates an example graph generation module 214 in accordance with some embodiments. Graph generation module 214 includes record receiving module 302, addition determination module 304, route decompose module 306, attribute encoding module 308, and indexing module 310. The record receiving module 302 is configured to receive and/or identify records that have not been considered to be included in the route graph. In some embodiments, record receiving module 302 may be configured to bulk receive a plurality of historical records from external data providers 130. Each historical record may be a segment or a route offered by one or more carriers. Alternatively, or in addition, record receiving module 302 may be configured to receive a record generated by a client device via the application 111. For example, when a user books a new trip via the application 111, a new booking record is received by record receiving module 302.

Addition determination module 304 determines whether each record received by record receiving module 302 is to be added to the route graph. For example, when a new record corresponds to an existing edge in the graph linking two nodes, addition determination module 304 may determine that data associated with the new record will not be added to the graph because the route graph already includes data associated with the new record.

Responsive to determining, by addition determination module 304, that a record is to be added to the route graph, route decompose module 306 decomposes a route in the record when the route includes multiple segments. For example, a route from airport A to airport D may include three segments, namely, a segment from airport A to airport B, a segment from airport B to airport C, and a segment from airport C to airport D. The route decompose module 306 decomposes the route into the three segments. Attribute encoding module 308 then encodes values of one or more attributes associated with the segments. In some embodiments, the attributes may include (but are not limited to) departure time, arrival time, a likelihood of delay, distance traveled, time traveled, a capacity of transportation mean, and/or a cost of a segment. The attributes may also include restrictions associated with the segments, such as (but not limited to) no carry-on luggage, booking in advance, nonrefundable, minimum stay, etc. Finally, indexing module 310 indexes one or more segments in the route into the route graph. In particular, the origin location and the destination location are indexed as nodes of the route graph, and values of the one or more attributes are indexed as edges of the route graph.

Figure 4:
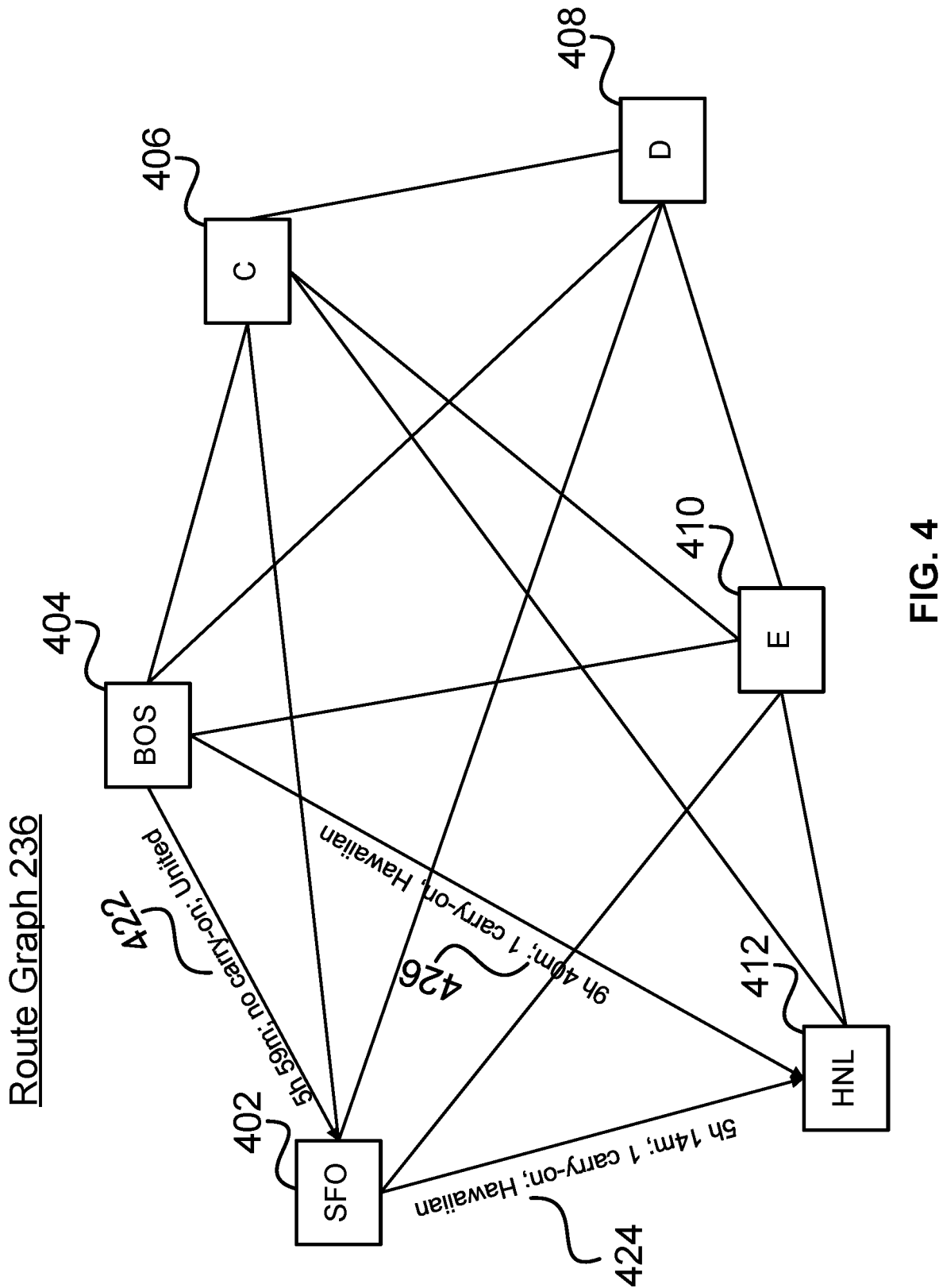
FIG. 4 illustrates an exemplary route graph generated by the graph generation module of a travel service system in accordance with some embodiments.

FIG. 4 illustrates an example route graph in accordance with some embodiments. Route graph 400 includes a plurality of nodes 402-412, and a plurality of edges 422-426. Each of the plurality of nodes 402-412 represents a travel hub location. For example, node 402 represents SFO (San Francisco Airport), node 404 represents BOS (Boston airport), node 412 represents HNL (Honolulu airport), and so on and so forth. Each of the plurality of edges 422-426 links two nodes and includes information indicative of values of attributes obtained based on historical records. The attributes may include (but are not limited to) departure time, arrival time, a likelihood of delay, distance traveled, time traveled, a capacity of transportation mean, a number of carry-on allowed, an airline name, and/or a cost of a segment. For example, edge 422 includes information about flights between BOS 404 to SFO 402, e.g., 5 hours 59 minutes; no carry-on; United Airline; edge 424 includes information about flights between SFO 402 and HNL 412, e.g., 5 hours 14 minutes; 1 carry-on; Hawaiian Airline; and edge 426 includes information about flights between BOS 404 and HNL 412, e.g., 9 hours 40 minutes; 1 carry-on; Hawaiian Airline.

In some embodiments, each attribute is assigned a weight, and an overall value is computed for each edge based on the weighted values of the attributes. When there are more flights between two same nodes, the attributes of different flights may be aggregated to generate a single value for the edge. In some embodiments, the edges do not include directions. A value corresponding to the edge is generated based on attributes for trips in both directions. In some embodiments, the edges include directions. For each direction of the edge, a different set of values for the attributes are generated. For example, edge 422 is from BOS 404 to SFO 402. For flights going from SFO 402 to BOS 404, another edge pointing in an opposite direction should be added.

Route Generation Module

Figure 5:
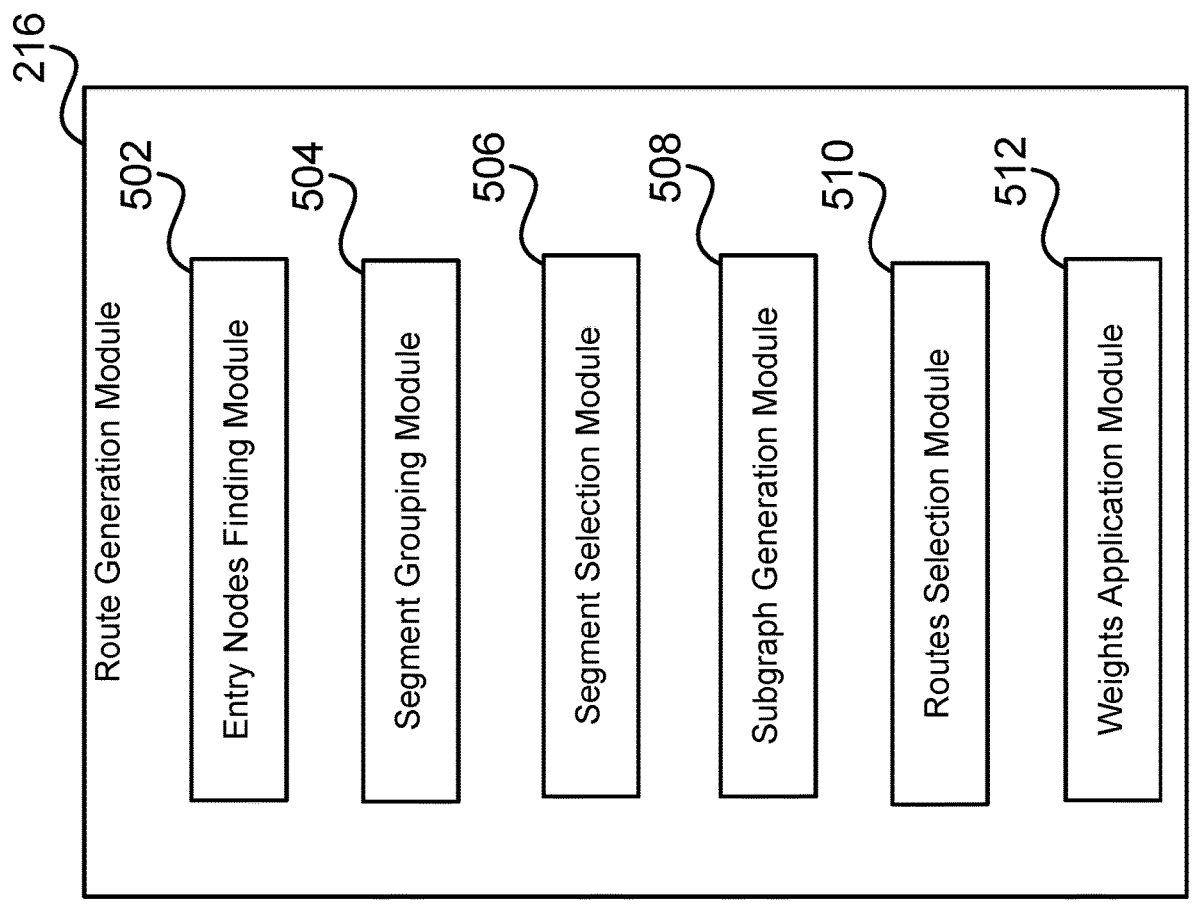
FIG. 5 illustrates an exemplary route generation module of the travel service system in accordance with some embodiments.

FIG. 5 illustrates one embodiment of an exemplary route generation module 216. Route generation module 216 includes entry nodes finding module 502, segment grouping module 504, segment selection module 506, a subgraph generation module 508, route selection module 510, and a weights application module 512. Entry nodes finding module 502 finds entry nodes associated with an origin location and/or a destination location. Segment grouping module 504 groups segments by a subset of a plurality of attributes.

In some embodiments, the subset of attributes may include (but are not limited to) time ranges and/or dates of week, duration, number of stops, and price. The segment grouping module 504 ensures routes are valid in terms of sequence of hubs (e.g., airports) they travel. Segment selection module 506 then compares values of the subset of attributes (or a weighted average of the subset of attributes) of the segments in a same time range and/or date of week, and selects a segment from each time range and/or date of week that has highest ranking of value(s) (or highest ranking of weighted average) of the one or more attributes. The default method of ranking values may be set by route generation module 216. For example, generally, a shorter total travel time is ranked higher; a shorter layover time is also ranked higher; allowing carry-on is ranked higher, etc. Subgraph generation module 508 then generates a subgraph based on the selected segments. Route selection module 510 then selects a set of routes in the subgraph that have an origin location and a destination location corresponding to the entry nodes.

Each of the selected routes is associated with a weight. A weight associated with a route is determined based in part on prior user input associated with the route, and/or comparison between data associated with the corresponding route (which includes segments offered by carriers lacking an interline agreement) and data associated with real routes offered by a single carrier or carriers with an interline agreement. The weights application module 512 retrieves the weight associated with each of the selected routes, and applies the weights to the selected routes to rank or adjust the ranking of the selected routes.

Figure 6:
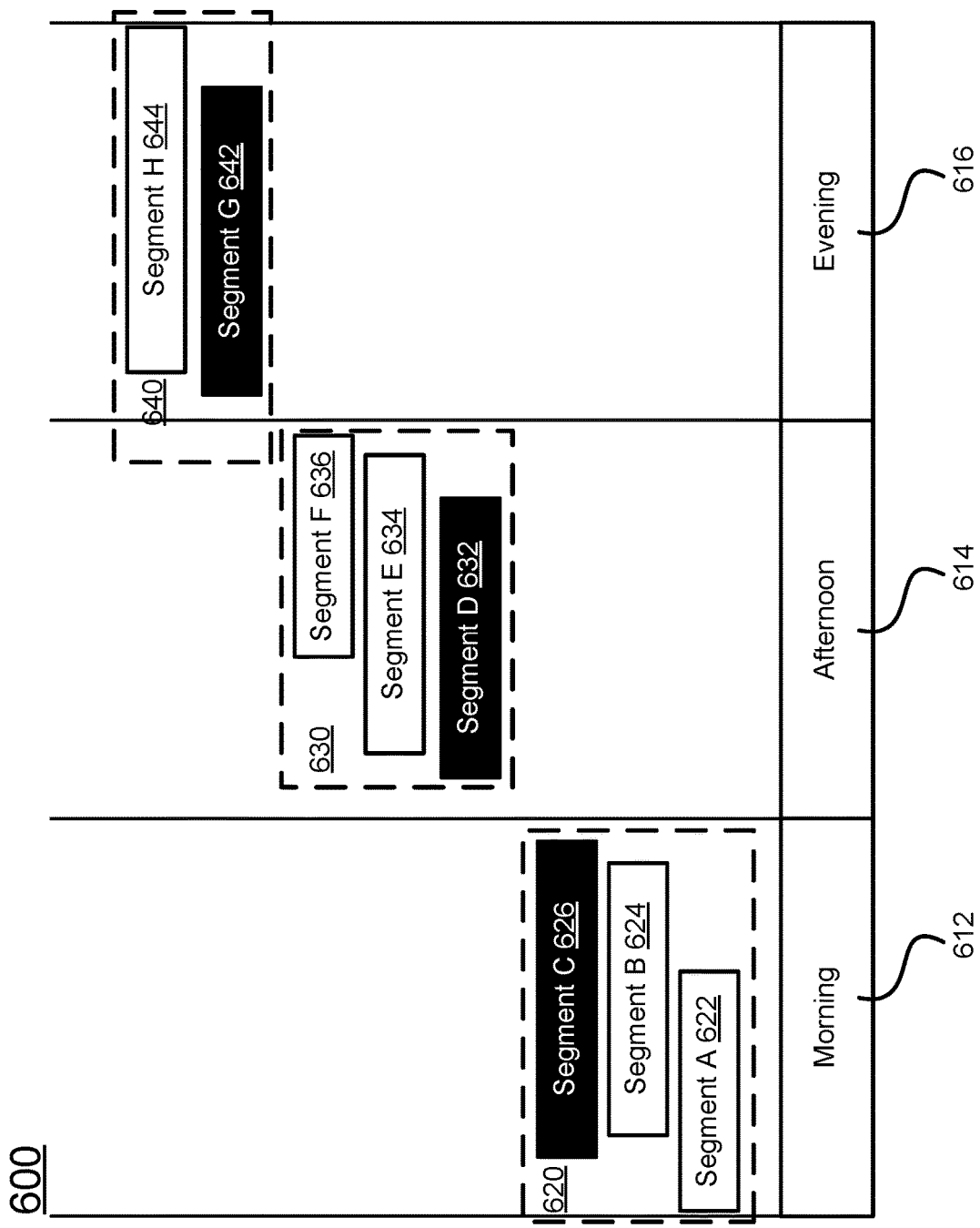
FIG. 6 illustrates an example process that may be performed by a segment selection module of a travel service system in accordance with some embodiments.

FIG. 6 illustrates one embodiment of an exemplary process 600 that may be performed by segment selection module 506. As illustrated in FIG. 6, each day is divided into a plurality of time ranges, namely morning 612, afternoon 614, and evening 616. Each of the time ranges 612, 614, 616 may have equal lengths or unequal lengths, which may depend on a total number of trip segments available during different periods of a day. Segment selection module 506 groups travel segments 622-644 between any given origin location and destination location into a plurality of groups based on their departure times. Note, each travel segment corresponds to a non-stop trip, including an origin location and a destination location, and no layovers therebetween. As illustrated, the departure times of segments 622, 624, 626 all fall in morning range 612; thus, these travel segments 622, 624, and 626 are grouped together as a single group 620. Similarly, the departure times of segments 632, 634, and 636 all fall in afternoon range 614; thus, these segments are grouped together as a single group 630. Again, departure times of segments 642 and 644 both fall in evening range 616; thus, these segments 642, 644 are grouped together as a single group 640.

For each group, segment selection module 506 selects subsets of the segments based on their values of one or more attributes. In some embodiments, a single segment that has the highest ranking values of the subset of attributes (or the highest ranking weighted average of the subset of attributes) is selected for each group. For example, the subset of attributes may include a cost and allowance of carry-on. In such a case, a segment that has the lowest cost and also allows carry-on is selected in each time range 612, 614, 616. As another example, the subset of attributes may include a cost and a cancellation rate. The constrained function may be that the cancellation rate needs to be lower than 1%. In such a case, a segment that has the lowest cost and also has a cancellation rate lower than 1% is selected in each time range 612, 614, 646.

In some embodiments, the subset of attributes may be selected by the travel service system 140 as default subset of attributes. In some embodiments, the subset of attributes may be set based on a user's indication and/or preference received from the application (e.g., application 111) installed on a client device (e.g., client device 110). In some embodiments, the one or more attributes may be set based on the user's historical data by an AI module (e.g., Feedback module 226).

As illustrated, segment C 626 (having the highest ranking values of attributes in group 620) is selected for the group that shares their departure time in morning range 612, segment D 632 (having the highest ranking values of attributes in group 630) is selected for the group that shares their departure time in afternoon range 614, and segment G 642 (having the highest ranking values of attributes in group 640) is selected for the group that shares their departure time in evening range 616. The selected segments are then used by subgraph generation module 510 to generate a subgraph. The subgraph is then used by the route selection module to generate a subset of routes, which in turn be used by route determination module 220 to determine one or more candidate routes.

Figure 7:
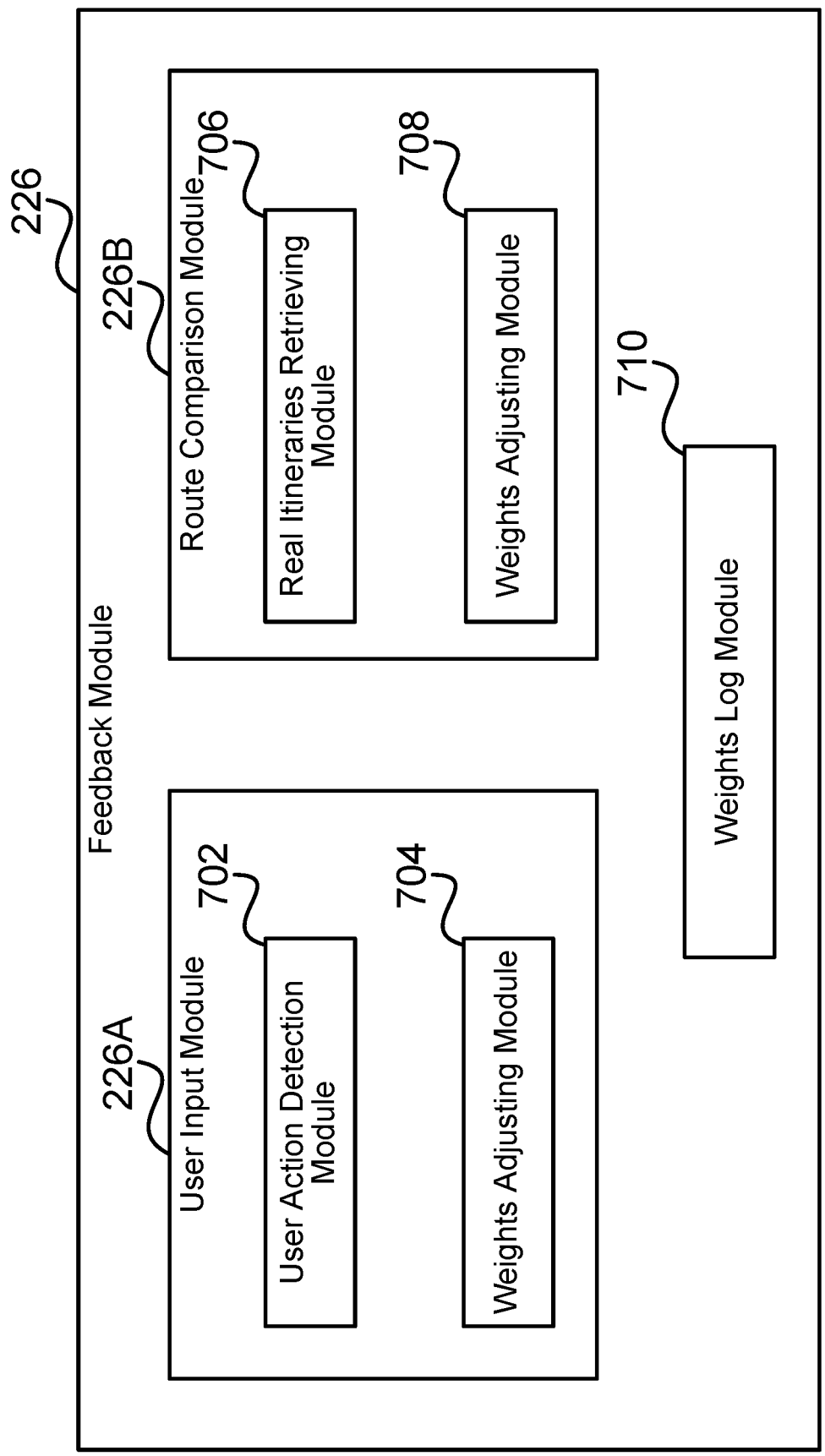
FIG. 7 illustrates an example feedback module of the travel service system in accordance with some embodiments.

FIG. 7 illustrates an example feedback module 226 in accordance with some embodiments. The feedback module 226 includes a user input module 226A, a route comparison module 226B, and a weight log module 710. The user input module 226A is configured to adjust a weight of a route based on user input, and the route comparison module 226B is configured to adjust a weight of a route based on comparison between the interline route and real routes offered by a single carrier or carriers with an interline agreement.

The user input module 226A includes a user action detection module 702 and a weights adjusting module 704. The user action detection module 702 is configured to detect user actions associated with routes displayed at a client device of the user. The user actions may include (but are not limited to) that the user's pointing device hovers over a particular route, that the user selects a particular route, the user clicks through a particular route, and the user purchases the segments in the route. The weights adjusting module 704 adjusts the weight of the particular route based on the user action or user input. For example, user selection or user click of the route may increase the weight by a first predetermined amount, and user purchasing of the segments in the route may increase the weight by a second predetermined amount.

The route comparison module 226B includes a real route retrieving module 706 and a weights adjusting module 708. The real routes retrieving module 706 is configured to retrieve data associated with real routes with a same origin location and a destination location that are offered by a single carrier or carriers with an interline agreement, and compares the data associated with a virtual interline route with the data associated with the real routes. In some embodiments, a value of an attribute associated with the virtual interline route is compared with a value of an attribute associated with the real route to determine a difference.

For example, the attribute may include (but is not limited to) a total trip time, and a total cost. The total trip time of a virtual interline route may be compared with a total trip time of a real route to determine a difference. The total cost of the virtual interline route may be compared with a total cost of a real route to determine a difference. There may be multiple real routes with the same origin location and the same destination location. The real routes retrieving module 706 may retrieve a real route with a best value of a particular attribute to compare the values of that attribute between the real route and the virtual interline route. For example, the real routes retrieving module 706 may retrieve a real route with a shortest trip time, and compare the trip time of the virtual interline route with the shortest trip time to determine a difference. If the total trip time of the virtual interline route is lower than the shortest total trip time of the real routes, the weights adjusting module 708 increases the weight of the virtual interline route. Alternatively, or in addition, the real routes retrieving module 7806 may retrieve a real route with a lowest cost, and compare the lowest cost with the cost of the virtual interline route. If the cost of the virtual interline route is lower than the lowest cost of the real routes, the weights adjusting module 708 increases the weight of the virtual interline route.

The weight log module 710 logs the weights and the corresponding virtual interline routes in a data store. The logged weights can later be retrieved by the weights application module 512 to apply the weights to selected routes.

Exemplary User Interface

Figure 8A:
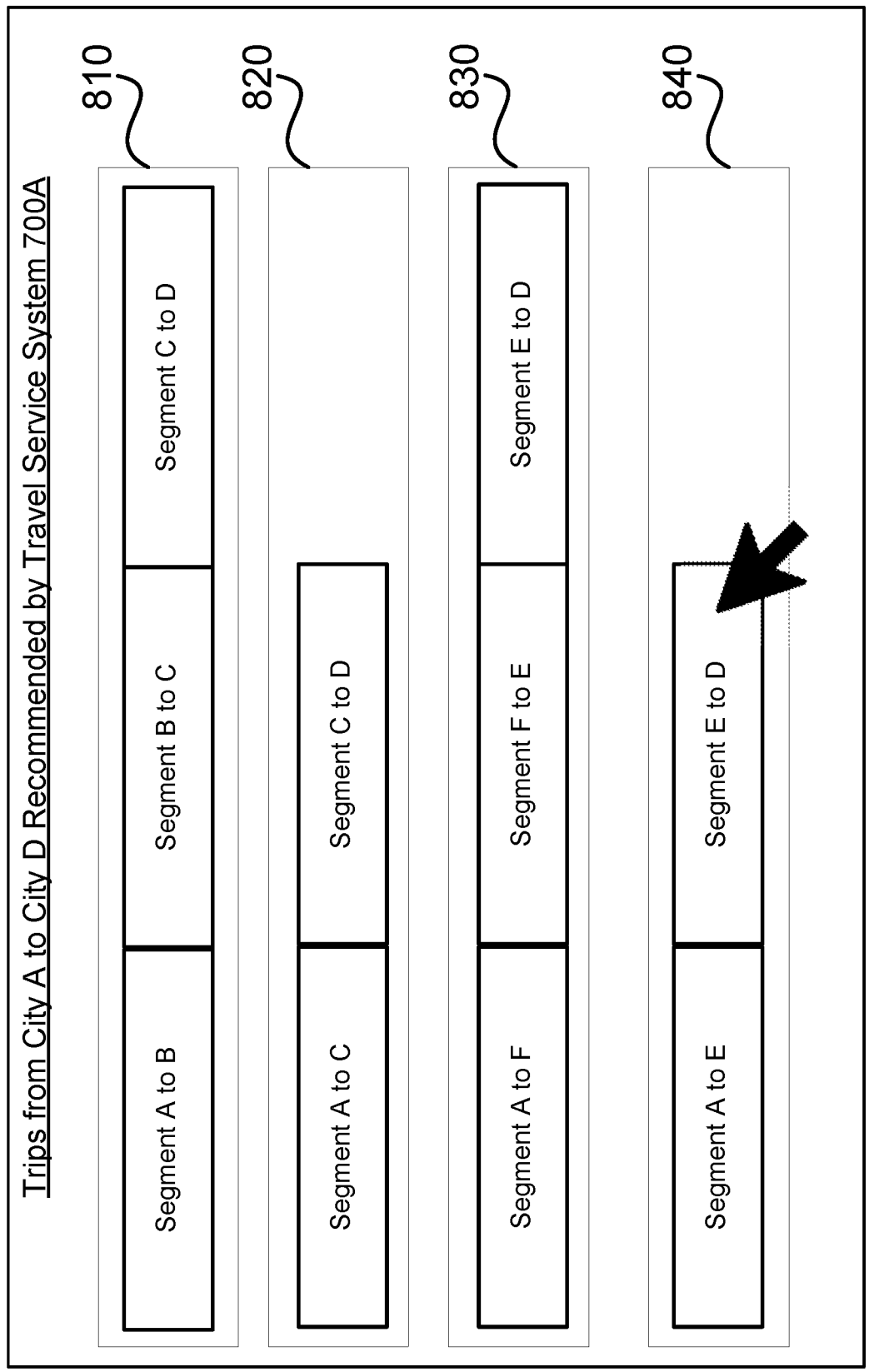
FIG. 8A illustrates an example UI generated by a UI generation module of the travel service system for displaying one or more candidate routes from city A to city D in accordance with some embodiments.
Figure 8B:
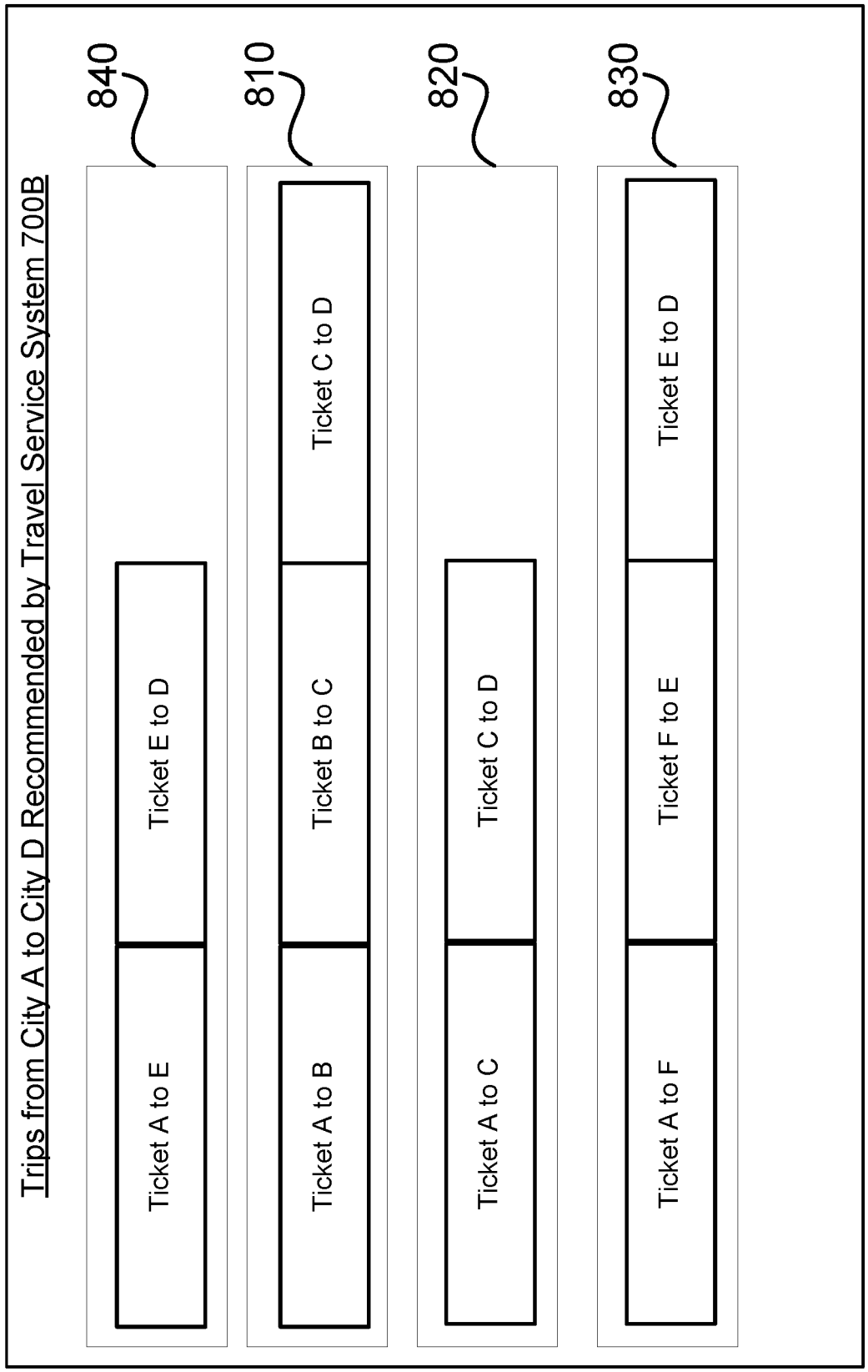
FIG. 8B illustrates an example UI updated by the UI generation module of the travel service system for displaying updated one or more candidate routes from city A to city D in accordance with some embodiments.

FIGS. 8A and 8B illustrate an embodiment of exemplary UI 800A, 800B generated by UI generation model 224 for displaying one or more candidate routes from airport A to city D determined by route determination module 220. As illustrated in FIG. 8A, UI 800A displays four candidate routes 810, 820, 830, 840. The four candidate routes 810-840 are ranked based on a subset of attributes and/or a constrained function, and displayed based on their respective rankings. The highest ranked candidate route 810 is displayed a highest and/or a most prominent location in the UI 800A. Route 820 is the second highest ranked route, and so on and so forth.

The first candidate route 810 includes three segments, namely a segment from airport A to city B, a segment from city B to city C, and a segment from city C to city D. The second candidate route 820 includes two segments, namely a segment from city A to city C, a segment from city C to city D. Similarly, the third candidate route 830 includes three segments, namely a segment from city A to city F, a segment from segment F to segment E, and a segment E to segment D. Again, the fourth candidate route includes two segments, namely segment from city A to city E, and a segment from city E to city D.

A user can select one of the candidate routes to review further details of the selected candidate route and/or book the candidate route. The user's interaction with the routes may be recorded as a part of the history data 232, which can further be used by feedback module 226 to modify a weight associated a route having the same origin location and destination location. The modification causes the same route to be ranked higher, responsive to receiving a new request. In some embodiments, the weights are only associated with the routes, as such the feedback loop can be implemented to improve route selection and trip building process for all users. Alternatively, or in addition, a separate set of weights are generated for each user, as such the feedback loop can be implemented to customize weights for each user.

For example, after the user selects the fourth route 840, the weight associated with the fourth route 840 is increased based on the user's selection, such that when the user requests to book a travel with the same origin location (e.g., city A) and destination location (e.g., city D), route generation module 216 and route determination module 220 ranks set of candidate routes 810-840 differently.

Similarly, a weight of a virtual interline route may be modified by comparison between data associated with the virtual interline route with data associated with a real route. The comparison may be performed at any time. In some embodiments, the comparison may be performed when the up-to-date data associated with the interline routes are obtained. In some embodiments, the comparison may be performed periodically. For example, the travel service system 140 may periodically obtain data associated with the virtual interline routes and corresponding real routes from external data providers 130 and compare them to update the weights for the virtual interline routes.

FIG. 8B illustrates another example UI 800B that is updated responsive to user's previous selection of route 840 via UI 800A. As illustrated in FIG. 8B, route 840 is now listed at the highest ranking route, and the rest of the routes 810-830 are listed below route 840. Such changes are caused by the increased weight associated with the route 840 triggered by the user's previous selection of route 840.

The embodiments described herein allow the travel service system 140 to dynamically modify the weight of each route based on user input and/or up-to-date data comparison between virtual interline routes and real routes, improving the function of the system 140 in the technical field of online travel booking.

Exemplary Methods for Generating and Displaying Candidate Routes for Travel

Figure 9:
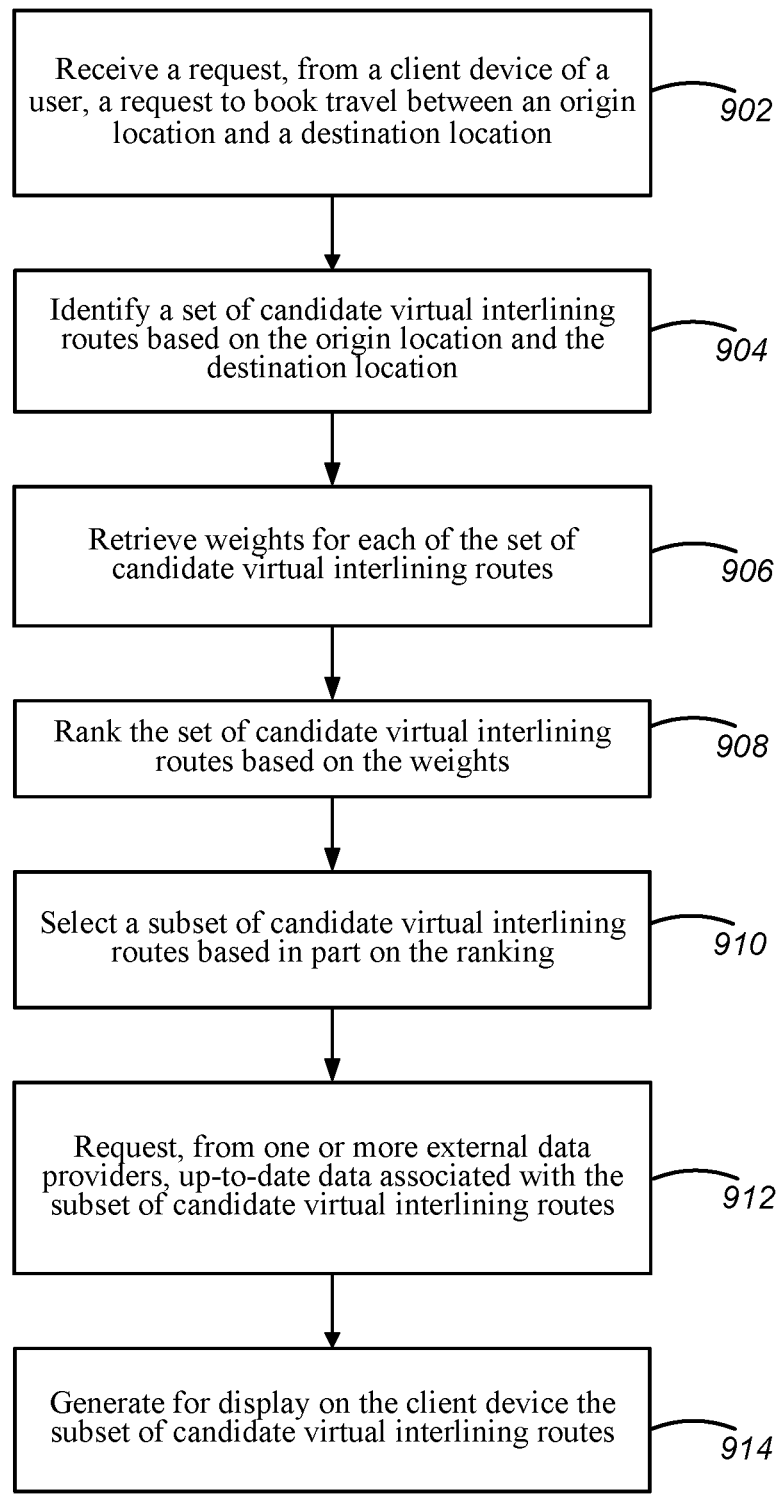
FIG. 9 is a flowchart of a method for recommending virtual interline routes based on a user request in accordance with some embodiments.

FIG. 9 illustrates one embodiment of an exemplary flow chart of a method 900 for generating and displaying candidate routes for travel at an application installed on a client device. Alternative method may include more, fewer, or different steps from those illustrated in FIG. 9. These steps may be performed by a travel service system (e.g., travel service system 140) or a computer system.

The travel service system receives 902 a request, from a client device of a user (e.g. client device 110), a request to book travel between an origin location and a destination location. In some embodiments, the client device 110 includes an application 111 that enables the user to generate the request. In some embodiments, application 111 may be a mobile application designed to perform specific tasks, enabling users to generate requests for booking travel. Alternatively, application 111 may be a web browser configured to access a web application provided by the travel service system.

The travel service system identifies 904 a set of candidate virtual interline routes based on the origin location and the destination location. In some embodiments, the set of candidate virtual interline routes are identified based on a route graph. In some embodiments, the route graph is generated based on historical data associated with segments. The historical data may be obtained by directly traversing external data provider 130 and/or from received historical user requests.

Each interline route is associated with a weight. The weights may be stored in a data store accessible by the travel service system. The travel service system retrieves 906 weights for each of the set of candidate interline routes. The travel service system ranks 908 the set of candidate virtual interline routes based in part on the weights. In some embodiments, the ranking is also based on values of attributes of the interline routes. The values of the attributes may be determined based on attributes of each segment of the interline routes, and the values of the attributes are weighted based on the weights. For example, the attributes may include (but are not limited to) a total trip time of a route, and/or a total cost of a route.

In some embodiments, for each virtual interline route, values of multiple attributes are summarized into a single score, which is then weighted based on the weight. The set of virtual interline routes are ranked based on the weighted scores.

The travel service system selects 910 a subset of candidate virtual interline routes based on the ranking. The travel service system requests 912, from one or more external data providers, up-to-date data associated with the subset of candidate virtual interline routes. The travel service system generates 914 for display on the client device the up-to-date data associated with the subset of candidate virtual interline routes. In some embodiments, the displayed subset of candidate virtual interline route is reranked based on the up-to-date data associated with the routes. In some embodiments, a higher-ranked route is showcased at the top, in a more noticeable position, and/or with greater prominence.

Figure 10:
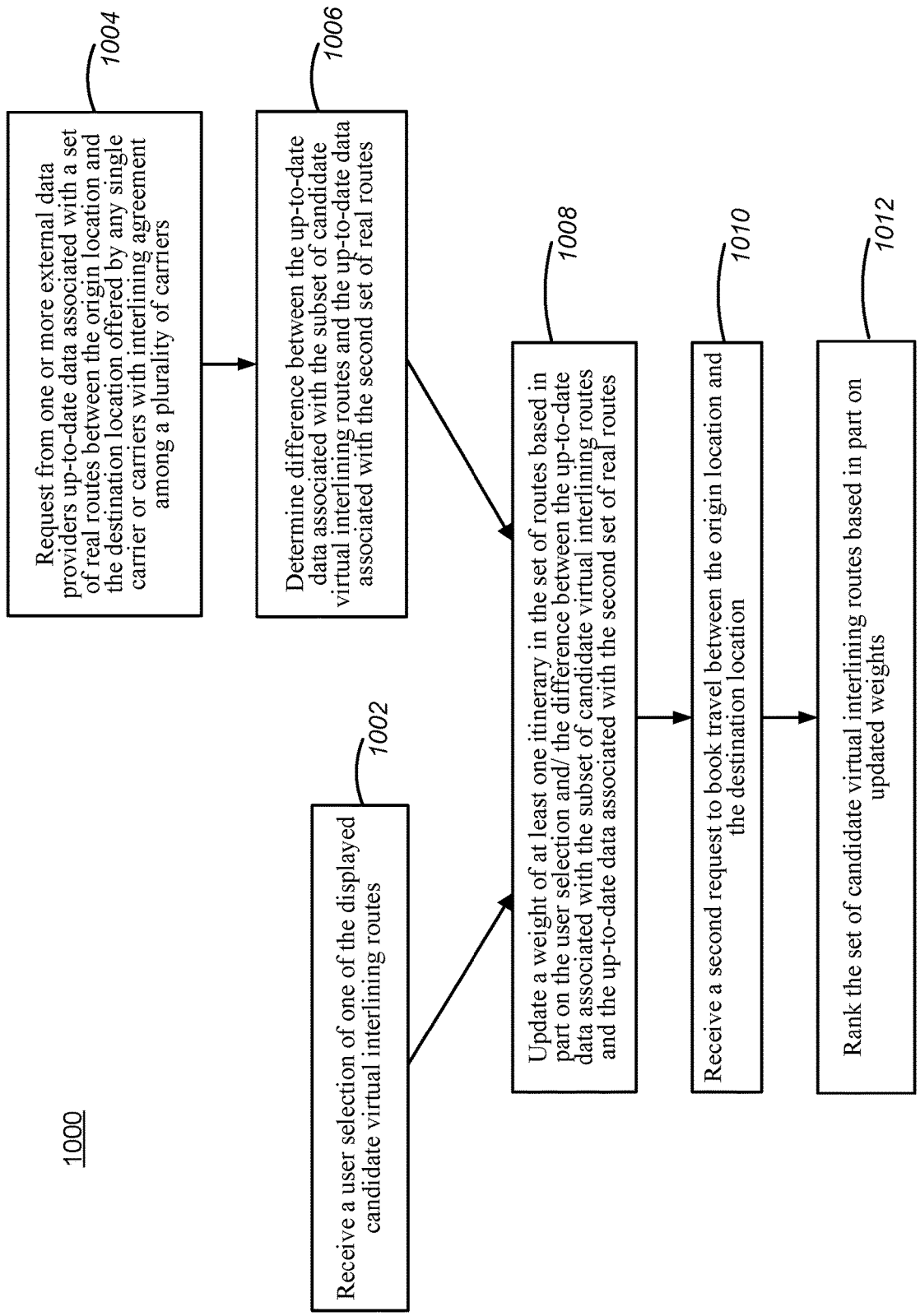
FIG. 10 is a flowchart of a method for updating weights associated with virtual interline routes based on user input and/or comparison between virtual interline routes and real routes in accordance with some embodiments.

FIG. 10 illustrates one embodiment of an exemplary flow chart of a method 1000 for updating weights associated with virtual interline routes. Alternative method may include more, fewer, or different steps from those illustrated in FIG. 10. These steps may be performed by a travel service system (e.g., travel service system 140) or a computer system.

In some embodiments, the travel service system receives 1002 a user selection of one of the displayed candidate virtual interline routes. The travel service system updates 1008 a weight of at least one itinerary in the set of routes based in part on the user selection.

In some embodiments, the travel service system requests 1004 from one or more external data providers up-to-date data associated with a set of real routes between the origin location and the destination location offered by any single carrier or carriers with interline agreement among a plurality of carriers. The travel service system determines 1006 difference between the up-to-date data associated with the subset of candidate virtual interline routes and the up-to-date data associated with the set of real routes. The travel service system updates 1008 a weight of at least one itinerary in the set of routes based in part on the difference between the up-to-date data associated with the subset of candidate virtual interline routes and the up-to-date data associated with the second set of real routes. In some embodiments, the up-to-date data associated with the real routes are obtained each time when a user request for booking travel is received. In some embodiments, the up-to-date data associated with the real routes are obtained periodically.

Responsive to receiving 1010 a second request to book travel between the origin location and the destination location, the travel service system ranks 1012 the set of candidate virtual interline routes based in part on updated weights. As such, the travel service system dynamically updates the weights of the virtual interline routes, allowing the travel service system to constantly improve itself to provide better ranking and suggestions to users.

Computing Machine Architecture

Figure 11:
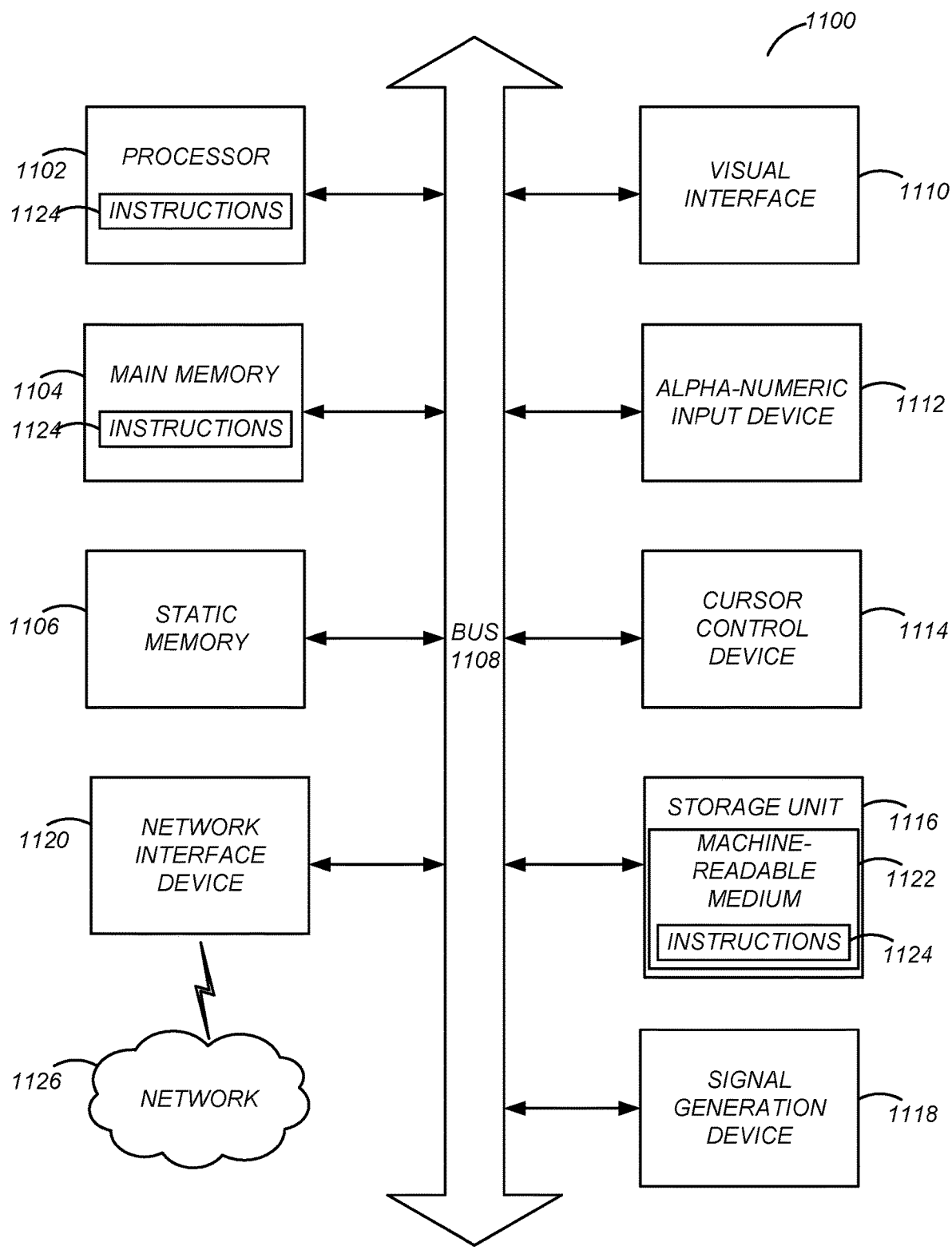
FIG. 11 is a block diagram illustrating components of an example machine able to read instructions from a machine-readable medium and execute them in a processor (or controller).

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100 within which program code (e.g., software) for causing the machine to perform any one or more of the methodologies discussed herein may be executed. The program code may be comprised of instructions 1124 executable by one or more processors 1102. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include visual display interface 1110. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1110 may include or may interface with a touch enabled screen. The computer system 1100 may also include alpha-numeric input device 1112 (e.g., a keyboard or touch screen keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. In other example embodiments, fewer or more modules may be used by the travel service system 140 to achieve the same or similar functionalities disclosed herein.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for performing database operations on historical travel data and analysis for virtual interline of travel routes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method implemented at a travel service system, the method comprising:
   receiving, from a client device of a user by the travel service system, a request to book travel between an origin location and a destination location;
   identifying a set of candidate virtual interline routes based on the origin location, the destination location, and a graph built based on historical user travel data, each candidate virtual interline route comprising a plurality of segments offered by different carriers among a plurality of carriers that lack an interline agreement, wherein the graph is a data structure including nodes and edges, each node corresponding to a travel hub locations and each edge linking nodes corresponding to travel segments based on historical user travel data, wherein the graph includes more than one hundred nodes and more than one hundred edges;
   retrieving a weight associated with each of the set of candidate virtual interline routes, wherein each weight associated with a candidate virtual interline route is determined based in part on prior user input associated with the candidate virtual interline route, wherein the weight is further based on comparison between historical data associated with the candidate virtual interline route and historical data associated with a real route between the origin location and the destination location offered by one or more carriers with an interline agreement;
   ranking the set of candidate virtual interline routes based on the weights;
   selecting a subset of the set of candidate virtual interline routes based on the ranking;
   requesting, by the travel service system, from one or more external data providers, data associated with segments of the subset of candidate virtual interline routes currently offered by the plurality of carriers; and
   generating for display on the client device, by the travel service system, up-to-date data associated with the subset of candidate virtual interline routes.

2. The method of claim 1, wherein identifying the set of candidate virtual interline routes comprises:
   accessing a route graph comprising nodes representing travel hub locations and edges connecting nodes representing segments of routes; and
   applying a constraint function to the route graph to identify the set of candidate virtual interline routes.

3. The method of claim 2, wherein each of the set of candidate virtual interline routes includes a set of attributes, and ranking of the set of candidate virtual interline routes comprises:
   for each of the set of candidate virtual interline routes,
      summarizing values of the set of attributes of the candidate virtual interline route into a score; and
      applying the weight associated with the candidate virtual interline route to generate a weighted score; and
   ranking the set of candidate virtual interline routes based on the weighted scores.

4. The method of claim 2, wherein for each of the set of candidate virtual interline routes, a set of attributes are associated with each of a plurality of segments of the candidate virtual interline route, and the set of attributes for the candidate virtual interline routes are computed based on the set of attributes of the plurality of segments.

5. The method of claim 1, the method further comprising:
   receiving a user selection of one of the displayed candidate virtual interline routes; and updating a weight of at least one virtual interline route in the set of virtual interline routes based in part on the user selection.

6. The method of claim 5, the method further comprising:
receiving, from a second client device, by the travel service system, a second request for booking travel between the origin location and the destination location;
reranking the set of candidate virtual interline routes based in part on the updated weight;
selecting a second subset of candidate virtual interline routes from the set of candidate virtual interline routes based on the reranked set of candidate virtual interline routes; and
generating for display on the second client device the up-to-date data associated with the second subset of candidate virtual interline routes.

7. The method of claim 1,
wherein the up-to-date data associated with the subset of candidate virtual interline routes are displayed in an order based on the ranking.

8. The method of claim 1, the method further comprising:
requesting, by the travel service system, from the one or more external data providers up-to-date data associated with a set of real routes between the origin location and the destination location offered by a single carrier or carriers with an interline agreement;
determining a difference between a value of an attribute associated with at least one candidate virtual interline route in the subset of candidate virtual interline routes and a value of the attribute associated with at least one real route in the set of real routes; and
updating a weight of the at least one virtual interline route based in part on the difference between the values of the attribute associated with the at least one candidate virtual interline route and the at least one real route.

9. A computer system comprising:
One or more processors; and
a non-transitory computer-readable storage medium having instructions encoded thereon that, when executed by the one or more processors, cause the one or more processors to:
  receive, from a client device of a user, a request to book travel between an origin location and a destination location;
  identify a set of candidate virtual interline routes based on the origin location, the destination location, and a graph built based on historical user travel data, each candidate virtual interline route comprising a first segment offered by a first carrier of a plurality of carriers and a second segment offered by a second carrier of the plurality of carriers that does not have an interline agreement with the first carrier, wherein the graph is a data structure including nodes and edges, each node corresponding to a travel hub locations and each edge linking nodes corresponding to travel segments based on historical user travel data, wherein the graph includes more than one hundred nodes and more than one hundred edges;
  retrieve a weight associated with each of the set of candidate virtual interline routes, wherein each weight associated with a candidate virtual interline route is determined based prior user input associated with the candidate virtual interline route, wherein the weight is further based on comparison between historical data associated with the candidate virtual interline route and historical data associated with a real route between the origin location and the destination location offered by one or more carriers with an interline agreement;
  rank the set of candidate virtual interline routes based in part on the weights;
  select a subset of candidate virtual interline routes based on the ranking;
  request, from one or more external data providers, up-to-date data associated with the subset of candidate virtual interline routes that are currently offered by a combination of one or more carriers among the plurality of carriers; and
  generate for display on the client device up-to-date data associated with the subset of candidate virtual interline routes.

10. The computer system of claim 9, wherein the instructions further cause the processor to:
access a route graph comprising nodes representing travel hub locations and edges connecting nodes representing segments of routes; and
apply a constraint function to the route graph to identify the set of candidate virtual interline routes.

11. The computer system of claim 10, wherein each of the set of candidate virtual interline routes includes a set of attributes, and ranking of the set of candidate virtual interline routes comprises:
for each of the set of candidate virtual interline route,
  summarizing values of the set of attributes of the candidate virtual interline route into a score; and
  applying the weight associated with the candidate virtual interline route to generate a weighted score; and
ranking the set of candidate virtual interline routes based on the weighted scores.

12. The computer system of claim 11, wherein the weight of each candidate virtual interline route is associated with an attribute of each segment in the candidate virtual interline route.

13. The computer system of claim 9, wherein the instructions further cause the processor to:
receive a user selection of one of the displayed candidate virtual interline routes; and
update a weight of at least one virtual interline route in the set of virtual interline routes based in part on the user selection.

14. The computer system of claim 13, the instructions further cause the processor to:
receive, from a second client device, a second request for booking travel between the origin location and the destination location;
rerank the set of candidate virtual interline routes based in part on the updated weight;
select a second subset of candidate virtual interline routes from the set of candidate virtual interline routes based on the reranked set of candidate virtual interline routes; and
generate for display on the second client device the up-to-date data associated with the second subset of candidate virtual interline routes.

15. The computer system of claim 9,
wherein the up-to-date data associated with the subset of candidate virtual interline routes are displayed in an order based on the ranking.

16. The computer system of claim 9, wherein the instructions further cause the processor to:
request from the one or more external data providers up-to-date data associated with a set of real routes between the origin location and the destination location offered by a single carrier or carriers with an interline agreement;

determine a difference between a value of an attribute associated with at least one candidate virtual interline route in the subset of candidate virtual interline routes and a value of the attribute associated with at least one real route in the set of real routes; and update a weight of the at least one virtual interline route based in part on the difference between the values of the attribute associated with the at least one candidate virtual interline route and the at least one real route.

17. The computer system of claim 9, wherein comparison between historical data associated with the candidate virtual interline route and historical data associated with a real route between the origin location and the destination location offered by a single carrier or carriers with an interline agreement.

18. A computer program product, comprising a non-transitory computer-readable storage medium having instructions encoded thereon that, when executed by one or more processors, cause one or more processors to:

receive, from a client device of a user, a request to book travel between an origin location and a destination location;

identify a set of candidate virtual interline routes based on the origin location, the destination location, and a graph built based on historical user travel data, each candidate virtual interline route comprising a first segment offered by a first carrier of a plurality of carriers and a second segment offered by a second carrier of the plurality of carriers that does not have an interline agreement with the first carrier, wherein the graph is a data structure including nodes and edges, each node corresponding to a travel hub locations and each edge linking nodes corresponding to travel segments based on historical user travel data, wherein the graph includes more than one hundred nodes and more than one hundred edges;

retrieve a weight associated with each of the set of candidate virtual interline routes, wherein each weight associated with a candidate virtual interline route is determined based prior user input associated with the candidate virtual interline route, wherein the weight is further based on comparison between historical data associated with the candidate virtual interline route and historical data associated with a real route between the origin location and the destination location offered by one or more carriers with an interline agreement;

rank the set of candidate virtual interline routes based in part on the weights;

select a subset of candidate virtual interline routes based on the ranking;

request, from one or more external data providers, up-to-date data associated with the subset of candidate virtual interline routes that are currently offered by a combination of one or more carriers among the plurality of carriers; and generate for display on the client device up-to-date data associated with the subset of candidate virtual interline routes.

19. The computer program product of claim 18, wherein identifying the set of candidate virtual interline routes comprises:

accessing a route graph comprising nodes representing travel hub locations and edges connecting nodes representing segments of routes; and applying a constraint function to the route graph to identify the set of candidate virtual interline routes.

* * * * *